Figure 1:
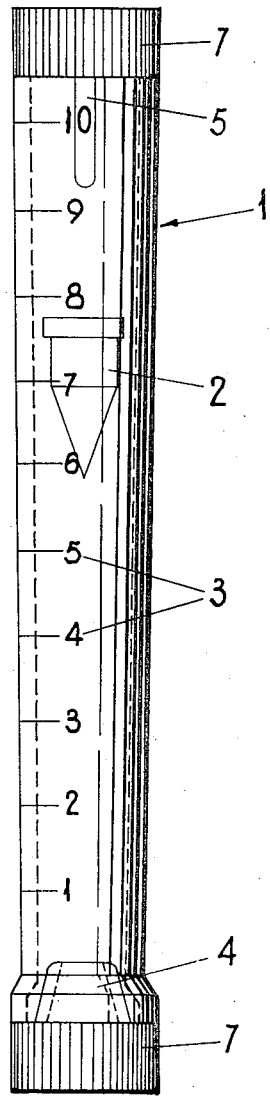

United States Patent [19]
Whalen

[11] 3,812,715
[45] May 28, 1974

[54] VARIABLE-AREA FLUID FLOWMETERS

[75] Inventor: Francis Cuthbert Whalen, London, England

[73] Assignee: Elliott Brothers (London) Limited, Chelmsford, England

[22] Filed: Aug. 9, 1972

[21] Appl. No.: 279,192

[30] Foreign Application Priority Data
Aug. 12, 1971   Great Britain............... 37979/71

[52] U.S. Cl. ............................................... 73/209
[51] Int. Cl. ............................................. G01f 1/00
[58] Field of Search ............................ 73/207–209

[56] References Cited
UNITED STATES PATENTS
3,101,710   8/1963   Koehn.................................. 73/209
3,232,108   2/1966   Ichihara............................... 73/209

Primary Examiner—Jerry W. Myracle
Attorney, Agent, or Firm—Kirschstein, Kirschstein, Ottinger & Frank

[57] ABSTRACT

A fluid flowmeter of the tapered tube and float type wherein the internal surface of the tube is provided with an electrically conductive coating and the tube carries a terminal whereby the coating may be grounded, thereby preventing the appearance of any electrostatic charge on the inner surface of the tube.

9 Claims, 2 Drawing Figures

PATENTED MAY 28 1974　　3,812,715

VARIABLE-AREA FLUID FLOWMETERS

This invention relates to variable-area fluid flowmeters of the kind comprising an internally tapered tube and a float contained within the tube and free to move therealong. In use the tube is mounted vertically with the wider end uppermost. The fluid is caused to flow upwardly through the tube and, by reason of the internal tapering of the tube, the float rises within the tube until it reaches an equilibrium position which position provides an indication of the rate of flow of the fluid.

The tube of such a flowmeter is typically made of an electrically insulating material and it is possible in such a case for an appreciable electrostatic charge to appear on the internal surface of the tube. This can arise, for example, if the flowmeter is shaken or temporarily disturbed from its vertical position so that the float rubs against the tube. In the presence of such an electrostatic charge the float may be attracted into contact with the tube, and will thus be prevented from responding to changes in the rate of flow of the fluid. The effect is particularly noticeable when the fluid in question is a dry gas.

It is an object of the present invention to provide a variable-area flowmeter of the kind specified in which the above-mentioned difficulty is overcome.

According to the present invention, in a variable-area fluid flowmeter of the kind specified in which the tube is made of an electrically insulating material, the internal surface of the tube is provided with a coating of a material of high electric conductivity compared with the material of the tube, and the tube carries at least one terminal for external connection electrically connected with the said internal coating.

Preferably the terminal is carried on the external surface of the tube.

In a preferred arrangement in accordance with the invention the tube carries two said terminals, one at each end of the tube.

The or each terminal is suitably constituted by an area of metallisation on the surface of the tube.

In use of a flowmeter in accordance with the invention the or each terminal is grounded, thereby grounding the internal conductive coating and preventing the appearance of any appreciable electrostatic charge on the inner surface of the tube. The or each terminal is suitably grounded via a fitting through which the fluid enters or leaves the tube in use, the fitting being made of an electrically conductive material and being connected to ground.

Figure 2:
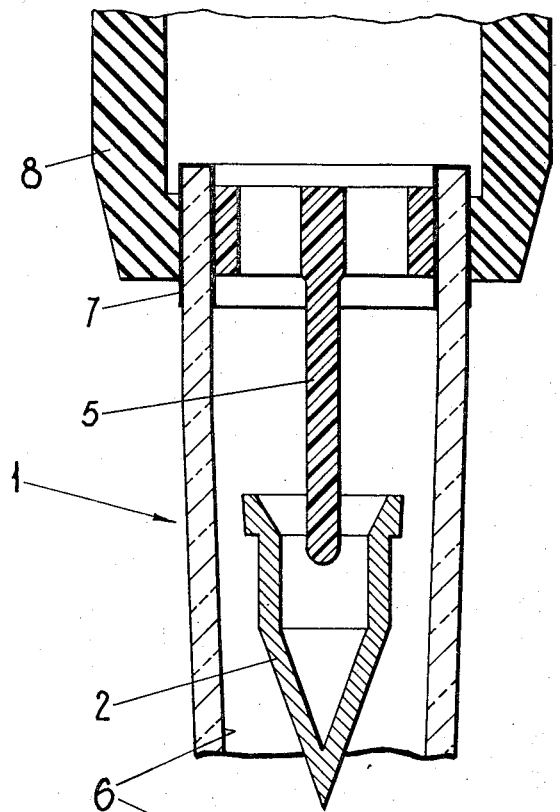
Figure 2:
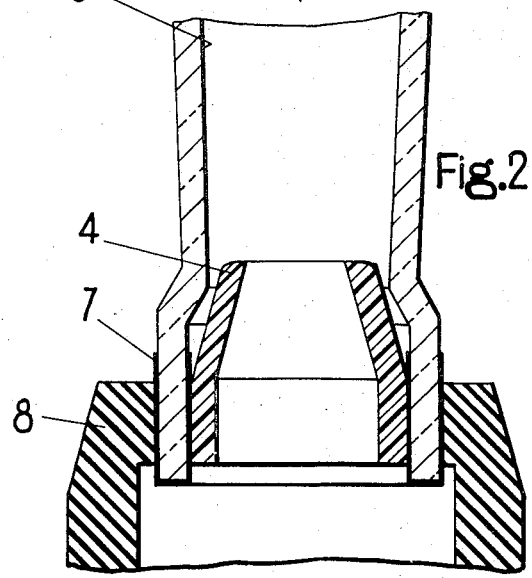

One flowmeter in accordance with the invention will now be described, by way of example, with reference to the accompanying drawing in which:

FIG. 1 is a front elevation of the flowmeter; and
FIG. 2 is an enlarged sectional view, partly broken.

Referring to the drawing, the flowmeter comprises a glass tube 1, of circular cross-section whose internal diameter tapers slightly along the major part of its length. Within the tube is a hollow metal float 2 of generally cylindrical shape, as shown.

In use, the tube is mounted vertically with the wider end uppermost. Fluid enters the tube 1 at the lower end and leaves by the upper end via adaptors 8, and the float 2 rises within the tube 1 to a position of equilibrium which is dependent on the rate of flow of the fluid.

Indicia 3 on the outer surface of the tube 1 form a scale by means of which the rate of flow can be quantitatively determined in appropriate units. Stops 4 and 5 are provided to limit the movement of the float 2 within the tube 1 without sensibly impeding the passage of the fluid.

On the internal surface 6 of the tube 1 there is provided a transparent electrically conductive coating (not visible in the drawing). The coating is suitably formed by the diffusion into the glass of the tube 1 of an oxide of tin produced by the thermal decomposition of the corresponding chloride.

At each end of the tube there is provided an area 7 of metallisation in good electrical contact with the adjacent end of the conductive coating on the internal surface of the tube 1. The area of metallisation 7 at each end of the tube 1 extends over the adjacent end of the tube and is continued for a short distance over the external surface of the tube to provide terminals adapted to make electrical contact with the adaptors 8 through which the fluid enters and leaves the flowmeter. The adaptors 8 themselves are made of an electrically conductive natural or synthetic rubber and provide a connection to ground in use of the flowmeter, thus grounding the conductive coating.

The areas of metallisation 7 are suitably formed by the application of a colloid suspension of gold, silver or platinum in an essential oil, and subsequent heating so as to produce an adherent metallic deposit.

One typical application of a flowmeter in accordance with the invention is for indicating the rate of supply of gas to a patient undergoing anaesthesia. The equipment for this purpose is normally mounted on a wheeled trolley, and it is often observed that movement of the trolley with its associated flowmeter or flowmeters will cause a rubbing of the float against the inner wall of the tube. In the absence of the grounded conductive layer which is the subject of this invention, the electrostatic charge so produced may cause the float to adhere to the inner wall of the tube so that it no longer responds to changes in the rate of flow of gas. If the gas is dry this condition may persist for a period of hours.

In the particular arrangement described above by way of example the tube 1 and its internal conductive coating consist of light-transparent material to allow the position of the float 4 to be determined visually. It will be appreciated that in other arrangements in accordance with the invention the tube material and/or its internal conductive coating may not be light-transparent, the position of the float being then determined by other than visual means, for example by the effect of the float on the inductance on an adjacent electric coil.

I claim:

1. A variable-area fluid flowmeter comprising: an internally tapered tube made of electrically insulating material through which flows the fluid whose rate of flow is to be measured; a float contained within the tube and free to move therealong so that, when the tube is positioned wider end uppermost and the fluid is caused to flow upwardly through the tube, the float takes up a position along the tube dependent on the rate of flow of the fluid; and means for indicating the position of the float in the tube and hence indicating the rate of flow of fluid through the tube; and wherein the internal surface of the tube is provided with a coating of a material of high electric conductivity compared with the material of the tube, and the tube carries at least one terminal for external connection electrically connected with said internal coating.

2. A flowmeter according to claim 1 wherein said terminal is carried on the external surface of the tube.

3. A flowmeter according to claim 1 wherein the tube carries two said terminals, one at each end of the tube.

4. A flowmeter according to claim 1 wherein said terminal is constituted by an area of metallisation on the surface of the tube.

5. A flowmeter according to claim 4 wherein said area of metallisation consists of gold, silver or platinum.

6. A flowmeter according to claim 1 wherein said tube and said coating are light-transparent.

7. A flowmeter according to claim 6 wherein said coating consists of an oxide of tin.

8. An arrangement for indicating the rate of flow of a fluid incorporating a flowmeter according to claim 1 wherein said terminal is grounded.

9. An arrangement according to claim 8 wherein said terminal is grounded via a fitting made of electrically conductive material through which the fluid enters or leaves the tube.

* * * * *